United States Patent [19]

Kuze et al.

[11] Patent Number: 5,016,695

[45] Date of Patent: May 21, 1991

[54] PNEUMATIC TIRE HAVING THE HIGHEST RIGIDITY TREAD RIB OFFSET FROM THE EQUATORIAL LINE

[75] Inventors: Tetsuya Kuze; Toshihiko Suzuki, both of Hiratsuka, Japan

[73] Assignee: The Yokohama Rubber Co., Ltd., Tokyo, Japan

[21] Appl. No.: 339,832

[22] Filed: Apr. 18, 1989

[30] Foreign Application Priority Data

Apr. 19, 1988 [JP] Japan .................................. 63-94552

[51] Int. Cl.$^5$ .............................................. B60C 11/04
[52] U.S. Cl. .............................. 152/209 A; 152/209 R
[58] Field of Search ........... 152/209 A, 209 R, 209 D

[56] References Cited

U.S. PATENT DOCUMENTS

| | | | |
|---|---|---|---|
| 3,286,756 | 11/1966 | Ellenrieder et al. | 152/209 A |
| 3,450,182 | 6/1969 | Verdier | 152/209 A |
| 4,635,694 | 1/1987 | Hosokawa | 152/209 A |
| 4,848,429 | 7/1989 | Mezzanotte | 152/209 A |

*Primary Examiner*—John J. Gallagher
*Assistant Examiner*—Geoffrey L. Knable
*Attorney, Agent, or Firm*—Armstrong, Nikaido, Marmelstein, Kubovcik & Murray

[57] ABSTRACT

A pneumatic tire having a tread pattern comprising a rib and a block, wherein a rib having the highest rigidity in the circumferential direction of the tire of said at least one rib is offset from the equatorial line of the tire to the shoulder side which is located on the outer side of a vehicle when the tire is mounted on the vehicle and the position of mounting of this rib and the width of the main groove on the shoulder side adjacent to this rib are specified respectively by formulae (I) and (II) described in the specification.

4 Claims, 5 Drawing Sheets

SA = 0°

SA = 1°

PNEUMATIC TIRE HAVING THE HIGHEST RIGIDITY TREAD RIB OFFSET FROM THE EQUATORIAL LINE

BACKGROUND OF THE INVENTION

The present invention relates to a pneumatic tire and more particularly to a pneumatic tire having a combination of driving stability with riding comfort by virtue of an improvement in the tread pattern.

It is known that the tread rigidity of a tire greatly influences the driving stability and the riding comfort. There is an antinomic relationship between the driving stability and the riding comfort, which has made it very difficult to attain a combination of both the performances. Specifically, an increase in the tread rigidity brings about an increase in the cornering power, which contributes to an improvement in the driving stability of the tire. However, this brings about an increase in the impact force applied to the tread surface, so that the riding comfort is lowered. The tread rigidity can be relatively easily altered by changing a pattern comprising ribs and blocks formed on the tread surface.

In the cornering of a vehicle, the angle of the direction of the advance of the vehicle relative to the circumferential direction of the deflected tire is called a "slip angle". In usual cornering of a general passenger car, as shown in FIG. 6, the slip angle $\theta$ of the tire is usually about 1°. From this point of view, as shown in FIG. 5, the tread pattern of the conventional tire for a passenger car generally comprises a rib 1 provided on the equatorial line (EL) of the tire and, provided in rows on the both sides thereof, a plurality of blocks 5 partitioned by main grooves 3 and subgrooves 4. However, the tire having this type of center rib brings about an increase in the cornering force at a slip angle as small as about 1°, which ensures the driving stability. However, since the rigidity of the center portion of the tire is large, the riding comfort is unfavorably poor.

SUMMARY OF THE INVENTION

An object of the present invention is to provide a pneumatic tire which enables a combination of both the performance, i.e., the driving stability and the riding comfort, to be attained.

An object of the present invention is to provide a pneumatic tire which is excellent in not only the driving stability at a slip angle as small as about 1° which is often employed in the cornering of a general passenger car but also the riding comfort during straight travelling.

In order to attain the above-described objects, the pneumatic tire of the present invention has a tread pattern comprising at least one rib provided in the circumferential direction of the tire and a plurality of blocks each formed by partitioning a tread surface into a plurality of main grooves provided in the circumferential direction of the tire and a plurality of subgrooves provided in the direction crossing the circumferential direction of the tire, wherein a rib having the highest rigidity in the circumferential direction of the tire of said at least one rib is offset from the equatorial line of the tire to the shoulder side which is located on the outer side of a vehicle when the tire is mounted on the vehicle.

Further, an important feature of the present invention resides in that in a rib having the highest rigidity in the circumferential direction of the tire of said at least one rib, when the distance from the equatorial line of the tire to the center in the widthwise direction of said rib is a, the width of said rib is b, the width and depth of the main groove provided on the shoulder side adjacent to said rib are c and e, respectively, and the distance from the tire equatorial line to the ground-contacting end of the shoulder portion is d, the distance a of said rib and the width c of said main groove satisfy respectively the following relationships:

$$0.2d \leq a \leq 0.65d \qquad (I)$$

$$(e/2) \leq c \leq (2b/3) \qquad (II)$$

DETAILED DESCRIPTION OF THE PREFERRED EMBODIMENTS

Figure 1:
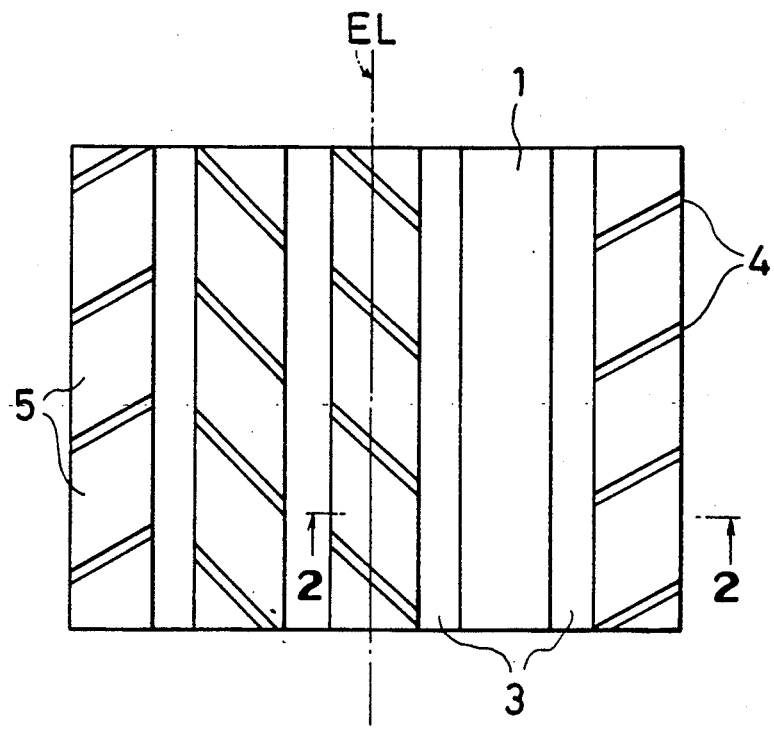
FIG. 1 is a plan view of an example of the tread pattern of the tire according to the present invention.
Figure 2:
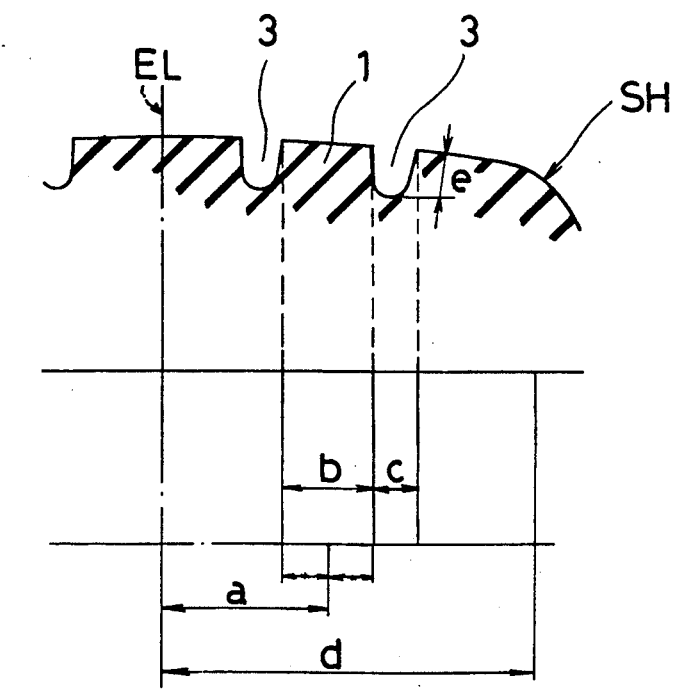
FIG. 2 is a perspective cross-sectional view taken along line II—II of FIG. 1.

As shown in FIGS. 1 and 2, in the tire of the present invention, a plurality of main grooves 3 are provided on the tread surface along the circumferential direction of the tire and, at the same time, a number of subgrooves 4 are provided so as to diagonally cross the circumferential direction of the tire. These main grooves 3 and subgrooves 4 constitute a rib 1 in the circumferential direction of the tire, and a number of blocks 5 are formed on both sides of the rib 1. Since the rib 1 is not broken in the widthwise direction of the tire by the subgrooves 4 as opposed to the blocks 5, the rigidity of the rib 1 in the circumferential direction of the tire is much higher than that of the blocks 5.

The tire having the above-described tread pattern is mounted on a vehicle so that the right side and the left side in the drawing refer to the outer side and the inner side of the vehicle, respectively. In such a mounted state, the rib 1 is provided at a position offset from the equatorial line (EL) of the tire towards the outer side SH of the tire where the shoulder smoothly blends from the tread surface to a sidewall portion of the tire as shown in FIG. 2.

More specifically, as shown in FIG. 2, the above-described rib 1 has such a dimension that when the distance from the equatorial line (EL) of the tire to the center position of the width of said rib 1 is a, the width of the rib 1 is b, the width and the depth of the main groove 3 on the shoulder side (SH) of the tire adjacent to the rib 1 are c and e, respectively, and the distance from the equatorial line (EL) of the tire to the ground-contacting end of the shoulder portion is d, the distance a of said rib and the width c of said main groove are as defined in the above-described formulae (I) and (II), respectively.

The provision of the rib 1 having higher rigidity than that of the other blocks 5 in the above-described manner contributes to an improvement in the driving stability during cornering at a low slip angle and improve the riding comfort during straight travelling.

Figure 7:
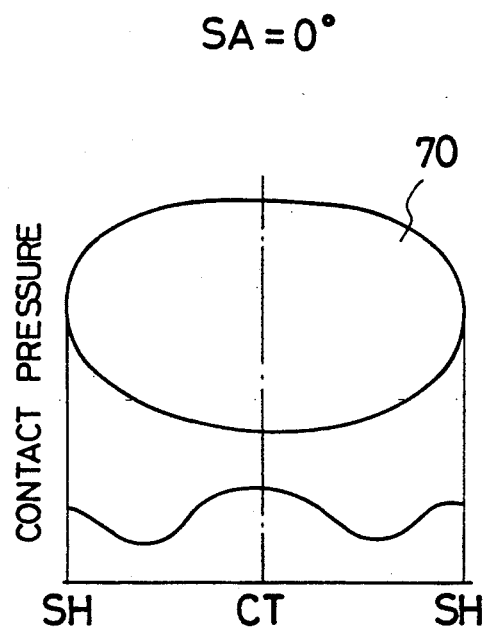
FIG. 7 is a diagram showing the relationship between the form of the ground-contacting surface and the contact pressure distribution of a smooth tire in the case of straight travelling.
Figure 8:
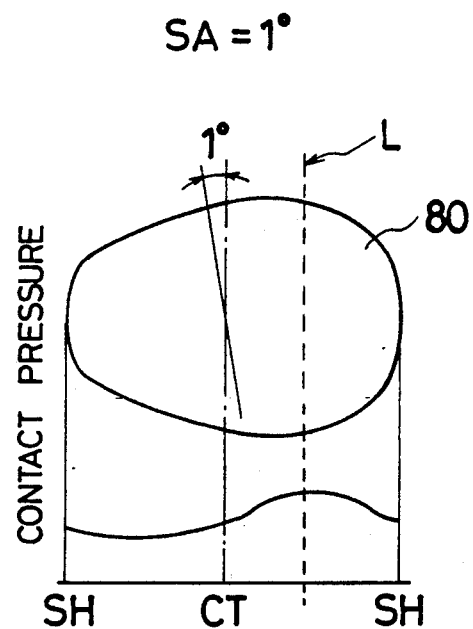
FIG. 8 is a diagram showing the relationship between the form of the ground-contacting surface and the contact pressure distribution of a smooth tire when the tire is travelled at a slip angle of 1°.

With respect to a smooth tire having no pattern on the tread surface thereof, the present inventors have investigated the form of the ground-contacting surface and the distribution of the contact pressure of the tread during straight travelling (slip angle=0°). As a result, it has been found that, as shown in FIG. 7, the ground-contacting surface has a form indicated by numeral 70, and the center portion CT and both the shoulder portions SH have the highest contact pressure. By contrast, when cornering is conducted on the left side relative to the direction of advance at a slip angle (SA) as small as 1°, as shown in FIG. 8, the form of the ground-contacting surface is as indicated by numeral 80, while the distribution of the contact pressure is such that the region L on the right side of the tire has the highest contact pressure and the contact pressure of the center portion CT of the tire is lowered. In view of the above, the rib 1 having a high rigidity was provided in the region L which exhibited the highest contact pressure when the tire was travelled at the above-described low slip angle, which contributed to an improvement in the driving stability through an increase in the cornering power. Further, in this case, since a block having a low rigidity corresponds to the center portion of the tire during straight travelling, the impact force of the tread is lowered, which contributes to an improvement in the riding comfort.

When the distance (shown by a) from the equatorial line (EL) to the center position in the widthwise direction of the rib 1 is smaller than 0.2 time the distance d from the above-described equatorial line (EL) to the ground-contacting end of the shoulder portion, the performance of the tire becomes similar to that of a tire having the conventional center rib pattern, so that no sufficient effect is attained by the offset of the rib 1 from above the equatorial line. On the other hand, when the rib 1 is provided at a position where the distance a is larger than 0.65 d, the position of the rib 1 for enhancing the cornering power is so close to the high-load region of the shoulder end portion of the tire, so that no sufficient effect is attained by the offset of the rib 1 from above the equatorial line. Further, the area of the shoulder portion becomes so small that the cornering power in the case of a large slip angle (SA) is remarkably lowered, which unfavorably exerts an adverse effect on the practical performance.

In order to effectively apply the highest contact pressure to the position where the rib 1 having a high rigidity has been offset, it is necessary that the width c of the main groove 3 provided on the side of the shoulder adjacent to the rib 1 satisfy the following relationship:

$(e/2) \leq c \leq (2b/3)$

That is, when the width of the main groove 3 on the side of the shoulder adjacent to the rib 1 is smaller than ½ of the depth e of the main groove 3, it becomes impossible to make the rib 1 independent of the main groove 3 with respect to the rigidity. This causes the main groove 3 to be easily crushed during cornering and become integral with the adjacent block row. Consequently, not only the rigidity of the rib but also the contact pressure is lowered, so that no sufficient effect of improving the driving stability can be attained.

On the other hand, when the width c of the main groove 3 is larger than ⅔ of the width b of the rib 1, the abrasion of the rib 1 becomes remarkable unfavorably.

In the tire of the present invention, there is no particular limitation with respect to the particular form and width of the rib having a high rigidity. However, the rib may be in the form of a straight line substantially in parallel to the circumferential direction of the tire or in the form of a bent line. The width of the rib is preferably 12 to 25 mm.

The number of ribs provided on the tire of the present invention is not limited to one which has been exemplified in the Examples but may be two or three. However, among these ribs, a rib having the highest rigidity should be provided at the position defined by the above-described formula (I). The width of the rib having the highest rigidity is preferably 12 to 25 mm.

Further, with respect to the rib 1 having the highest rigidity, there is no particular limitation with respect to the width and depth of the main groove 3 on the side of the equatorial line (EL) of the tire. However, it is preferred that the width and the depth of the main groove be 2 to 8 mm and 6 to 8 mm, respectively.

Figure 4:
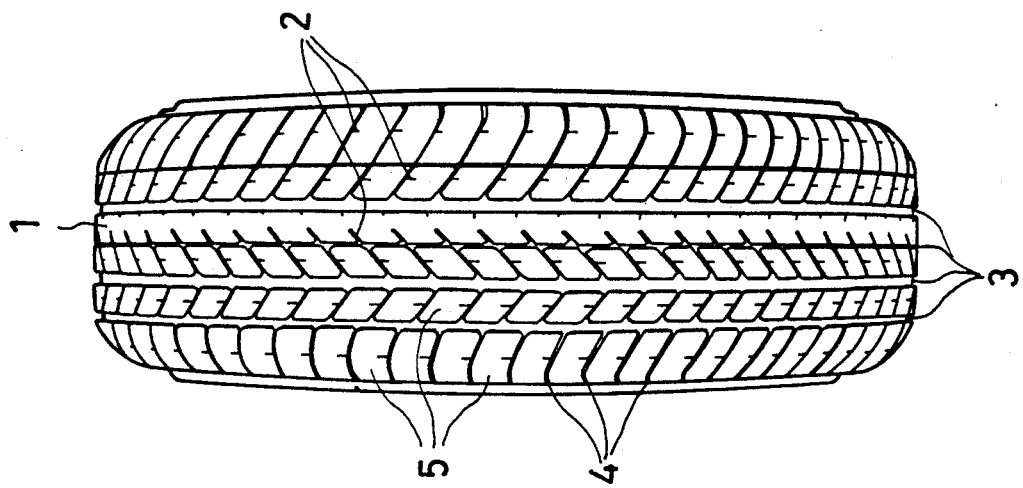
FIGS. 3 and 4 are front views of an example of the tire according to the present invention.
Figure 3:
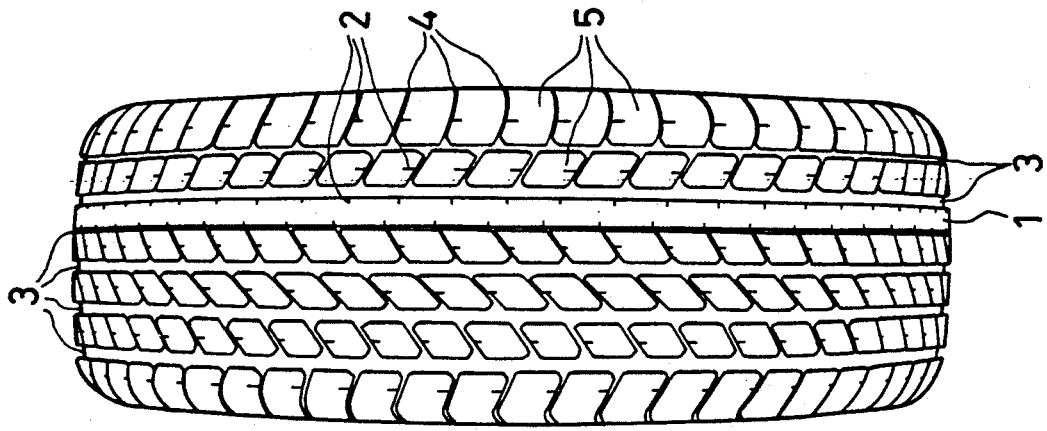

In the rib and block provided on the tire of the present invention, the provision of a thin notch 2, such as kerf, as shown in, e.g., FIGS. 3 and 4 enables the rigidity of the rib 1 and block 5 to be regulated.

Further, since it is necessary to mount the tire of the present invention on a vehicle in such a manner that the rib having the highest rigidity is located on the outer side of the vehicle in order to facilitate the mounting, it is preferred to put a mark on the side of the tire for specifying the mounting method.

As described above, the tire of the present invention enables a combination of an improvement in the driving stability at a small slip angle with an improvement in the riding comfort during straight travelling through the offset of a rib having the highest rigidity in the circumferential direction of the tire of at least one rib provided on the tread surface by a particular distance from the equatorial line of the tire.

EXAMPLE 1

The following two types of tires, i.e., a tire I of present invention and a conventional tire II were prepared.

These tires each had a tire size of 195/60R14, a rim size of 14×6JJ, and a pneumatic pressure of 2.0 kg/cm².

Tire I of the present invention: tread pattern: FIG. 1

$a = 30$ mm, $b = 20$ mm, $c = 10$ mm,
$d = 70$ mm, $e = 8$ mm $(a/d) = 0.43$
$(e/2) = 4$ mm
$(2b/3) = 13.3$ mm

Figure 5:
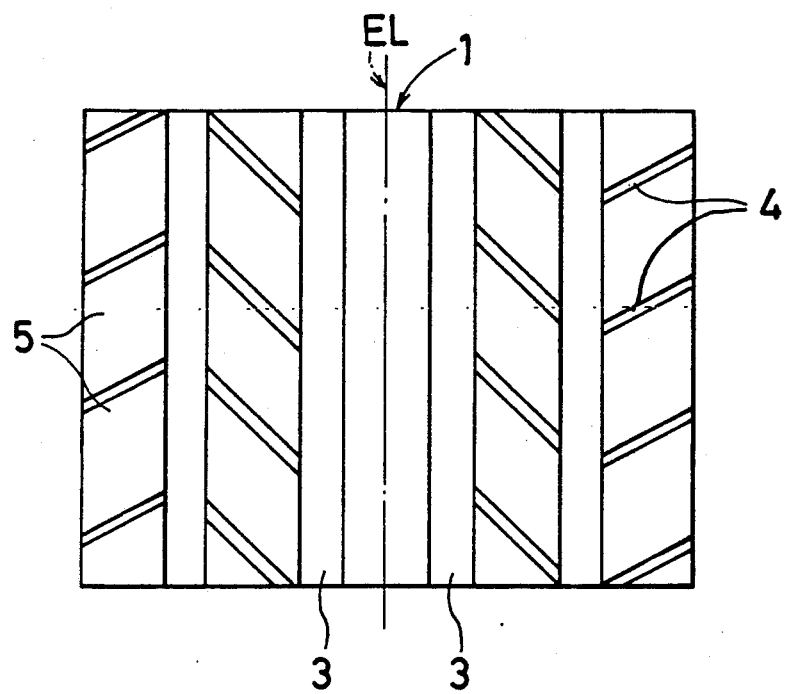
FIG. 5 is a plan view of an example of the tread pattern of the conventional tire.
Figure 6:
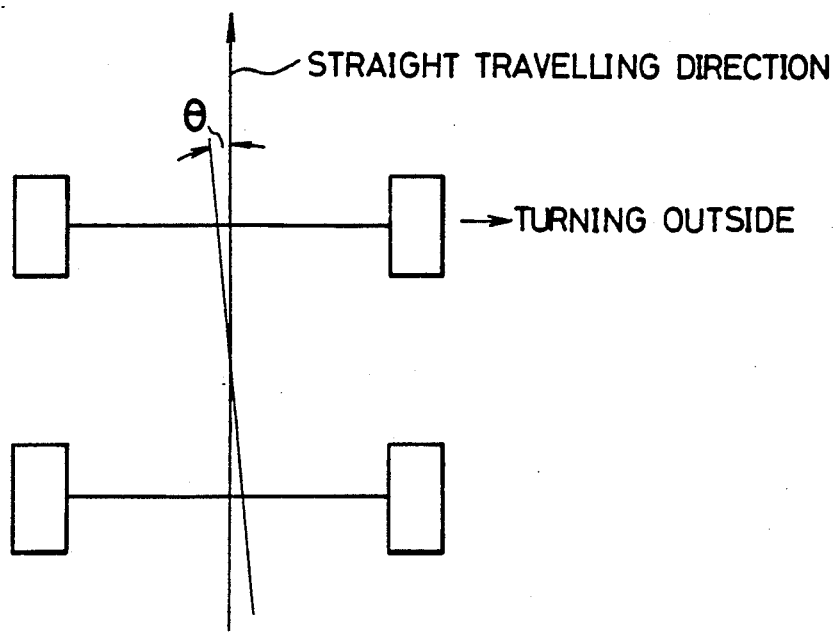
FIG. 6 is a schematic plan view of a four-wheeled vehicle having tires mounted thereon.

Conventional tire II: tread pattern: FIG. 5
dimensions of b, c, d, and e:
the same as those of the tire I The cornering power (CP) was measured by giving a slip angle $\theta$ of 1° to the left direction relative to the rotation direction of the tire and changing the load. The results are shown in FIG. 9.

For reference, the above CP was measured by mounting the tire I of the present invention on a vehicle in such a manner that the rib having the highest rigidity is located on the inner side of the vehicle. This is a reference case shown as the reference tire III.

Figure 9:
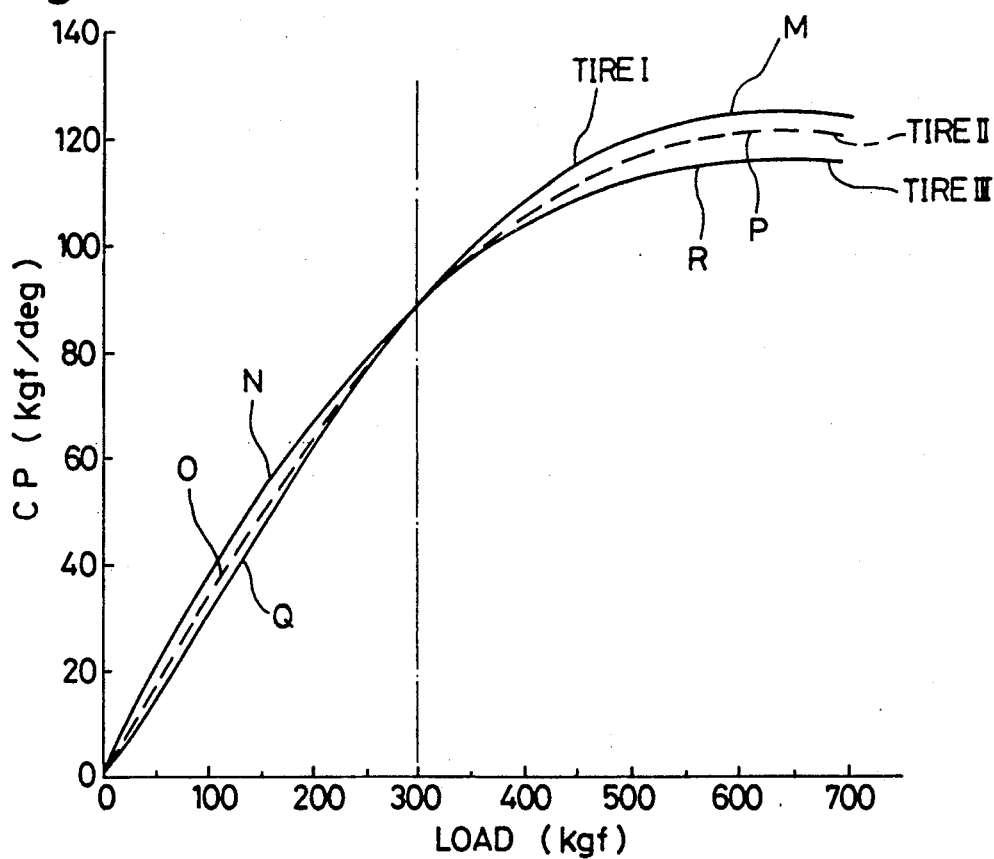
FIG. 9 is a graph showing the relationship between the cornering power (CP) of the tire and the load.

As is apparent from FIG. 9, the CP of the tire I of the present invention is high in a region where the load exceeds 300 Kg, and the CP of the conventional tire II and reference tire III are high in a region where the load is lower than 300 Kg.

This substantiates that, in the high-load region, the CP value can be remarkably increased as the rigidity on the outer side of the tire I of the present invention increases because the rib having the highest rigidity is provided in such a manner that the rib offsets from the equatorial line to the outer side of the tire.

In the low-load region, since the contact pressure per unit area is lowered, the rib having a high rigidity reversely influences, so that a higher CP value is obtained in reference tire III and conventional tire II, particularly reference tire III, wherein the rib and the block rows having a low rigidity are located respectively on the inner side and the outer side of the vehicle.

In general, the CP of the tire in which the rib having a high rigidity is located at the outer side to the turning direction of the vehicle is higher than the static load (300 Kg in FIG. 9) of the vehicle because the load is moved in the turning direction of the vehicle.

By contrast, the CP of the tire in which the rib having a high rigidity is located at the inner side to the turning direction of the vehicle, is lower than the static load of the vehicle.

That is, the turning performance of the vehicle is proportional to the sum of the CP values of the tire located on the outer side and on the inner side of the vehicle. In FIG. 9, therefore, the CP values of tire I of the present invention, conventional tire II, and reference tire III are M+N, O+P, and Q+R, respectively, that is, reference tire III exhibits the lowest CP value. Therefore, the order of the driving stability is as follows: Tire I of the present invention > conventional tire II > reference tire III.

The above-described tire I of the present invention and conventional tire II were each subjected to an actual vehicle test by three panelists to evaluate the steerability, response, and stability on the basis of 10 points (average value; rounded off to the first place), thereby evaluating the driving stability.

For reference, the above test on the driving stability was evaluated by mounting the tire I of the present invention on the vehicle in such a manner that the rib having the highest rigidity is located on the inner side of the vehicle. This is a reference case shown as the reference tire III. The results were as follows:
tire I of the present invention: 8.7
conventional tire II: 7.3
reference tire III: 6.3

EXAMPLE 2

Tire I of the present invention and conventional tire II, each prepared in Example 1 were subject to a test on the riding comfort through measurement of the tangential impact force of the tire applied during travelling on a protrusion with an indoor drum tester comprising a drum of 2500 mm in diameter having one semicircular protrusion of 10 mm in the radius provided on the periphery thereof in the direction of the drum shaft. The results are shown in FIG. 10.

Figure 10:
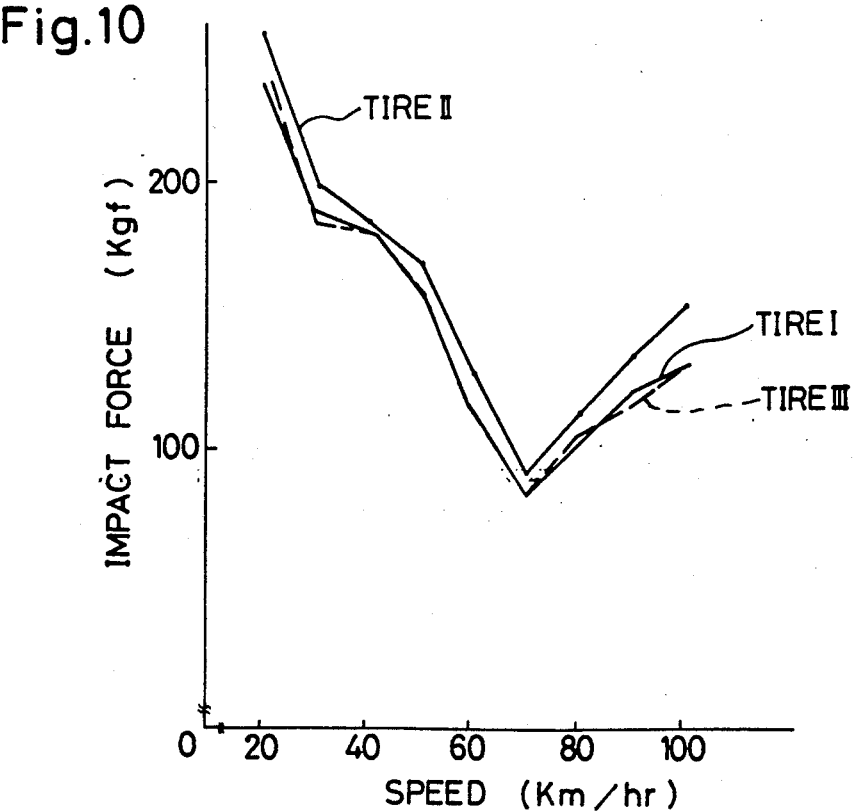
FIG. 10 is a graph showing the relationship between the impact force in the tangential direction of the tire and the travel speed of the tire.

It is apparent from FIG. 10 that tire I of the present invention and reference tire III exhibit in the whole speed region a smaller tangential impact force of the tire which greatly influences the riding comfort than that of conventional tire II. This is because tire I of the present invention and reference tire III each have a lower rigidity than that of conventional tire II in the center region thereof which exhibits the highest contact pressure during straight travelling.

Further, these tires were each subjected to an actual vehicle test by three panelists to conduct feeling evaluation of the riding comfort on the basis of 10 points (average value; rounded off to the first place). The results were as follows:
tire I of the present invention: 7.7
conventional tire II: 7.0
reference tire III: 7.7

COMPARATIVE EXAMPLE

Four types of comparative tires IV to VII were prepared wherein the values of a, b, c, a/d ratio, and 2b/3 ratio were changed as shown in the following Table. These tires were evaluated under the same condition as that employed in the evaluation of tire I of the present invention. The results are shown in the following Table.

| | Comparative Tires | | | |
| --- | --- | --- | --- | --- |
| | IV | V | VI | VII |
| a | 12 mm | 46 mm | 30 mm | 30 mm |
| b | 20 mm | 15 mm | 20 mm | 20 mm |
| c | 10 mm | 7 mm | 3 mm | 15 mm |
| d | 70 mm | 70 mm | 70 mm | 70 mm |
| e | 8 mm | 8 mm | 8 mm | 8 mm |
| (a/d) | 0.17 | 0.66 | 0.43 | 0.43 |
| (e/2) | 4 mm | 4 mm | 4 mm | 4 mm |
| (2b/3) | 13.3 mm | 10 mm | 13.3 mm | 13.3 mm |
| Driving Stability | 7.4 | 7.0 | 7.5 | 8.2 |
| Riding Comfort | 7.0 | 7.0 | 7.5 | 7.7 |
| Abrasion Resistance | no problem | abrasion of outer shoulder | no problem | rapid abrasion of rib |

Comparative tire IV had the same performance as that of conventional tire II having a rib provided in the center region.

Comparative tire V was poor in the driving stability and abrasion resistance due to an excessively small size of the shoulder block provided on the ground-contacting end portion. Further, since the rib corresponded to the portion of the shoulder exhibiting a high contact pressure, comparative tire V was poor in the riding comfort as well.

Comparative tire VI exhibited a low contact pressure of the rib and no increase in the CP value, so that no significant improvement in the driving stability was attained.

Comparative tire VII exhibited remarkable abrasion during turning.

What is claimed is:
1. A pneumatic radial tire having a tread pattern and a shoulder side of the tire located on an outer side of a vehicle when the tire is mounted on the vehicle which smoothly blends from a tread surface to a sidewall portion of the tire when viewed in cross-section, comprising: at least one rib provided in the circumferential direction of the tire and a plurality of blocks each formed by partitioning the tread surface into a plurality of main grooves provided in the circumferential direction of the tire and a plurality of subgrooves provided in the direction crossing the circumferential direction of the tire, wherein a rib having the highest rigidity in the circumferential direction of the tire of said at least one rib is offset from the equatorial line of the tire to said shoulder side of the tire; a group of said blocks are formed on both sides of said rib having the highest rigidity in the circumferential direction of the tire and in a rib having the highest rigidity in the circumferential direction of the tire of said at least one rib, when the distance from the equatorial line of the tire to the center in the widthwise direction of said rib is a, the width b of said rib is 12 to 25 mm, the width and depth of the main groove provided on the shoulder side adjacent to said rib are c and e, respectively, and the distance from the equatorial line of the tire to the ground-contacting end of the shoulder portion is d, the distance a of said rib and the width c of said main groove satisfy respectively the following relationships:

$$0.2d \leq a \leq 0.65d \quad (I)$$

$$(e/2) \leq c \leq (2b/3) \quad (II).$$

2. A pneumatic tire according to claim 1, wherein the number of said at least one rib is one to three.

3. A pneumatic tire according to claim 1, wherein the width c and depth e of the main groove of said rib having the highest rigidity in the circumferential direction of the tire and adjacent to the shoulder side are 2 to 8 mm and 6 to 8 mm, respectively.

4. A passenger car pneumatic radial tire having a tread pattern and a shoulder side of the tire located on an outer side of a vehicle when the tire is mounted on the vehicle which smoothly blends from a tread surface to a sidewall portion of the tire when viewed in cross-section, comprising: at least one rib provided in the circumferential direction of the tire and a plurality of blocks each formed by partitioning a tread surface into a plurality of main grooves provided in the circumferential direction of the tire and a plurality of subgrooves provided in the direction crossing the circumferential direction of the tire, wherein a rib having the highest rigidity in the circumferential direction of the tire of said at least one rib is offset from the equatorial line of the tire to said shoulder side of the tire; a group of said blocks are formed on both sides of said rib having the highest rigidity in the circumferential direction of the tire and in a rib having the highest rigidity in the circumferential direction of the tire of said at least one rib, when the distance from the equatorial line of the tire to the center in the widthwise direction of said rib is a, the width b of said rib is 12 to 25 mm, the width and depth of the main groove provided on the shoulder side adjacent to said rib are c and e, respectively, and the distance from the equatorial line of the tire to the ground-contacting end of the shoulder portion is d, the distance a of said rib and the width c of said main groove satisfy respectively the following relationships:

$$0.2d \leq a \leq 0.65d \quad (I)$$

$$(e/2) \leq c \leq (2b/3) \quad (II).$$

* * * * *